United States Patent Office 3,401,763
Patented Sept. 17, 1968

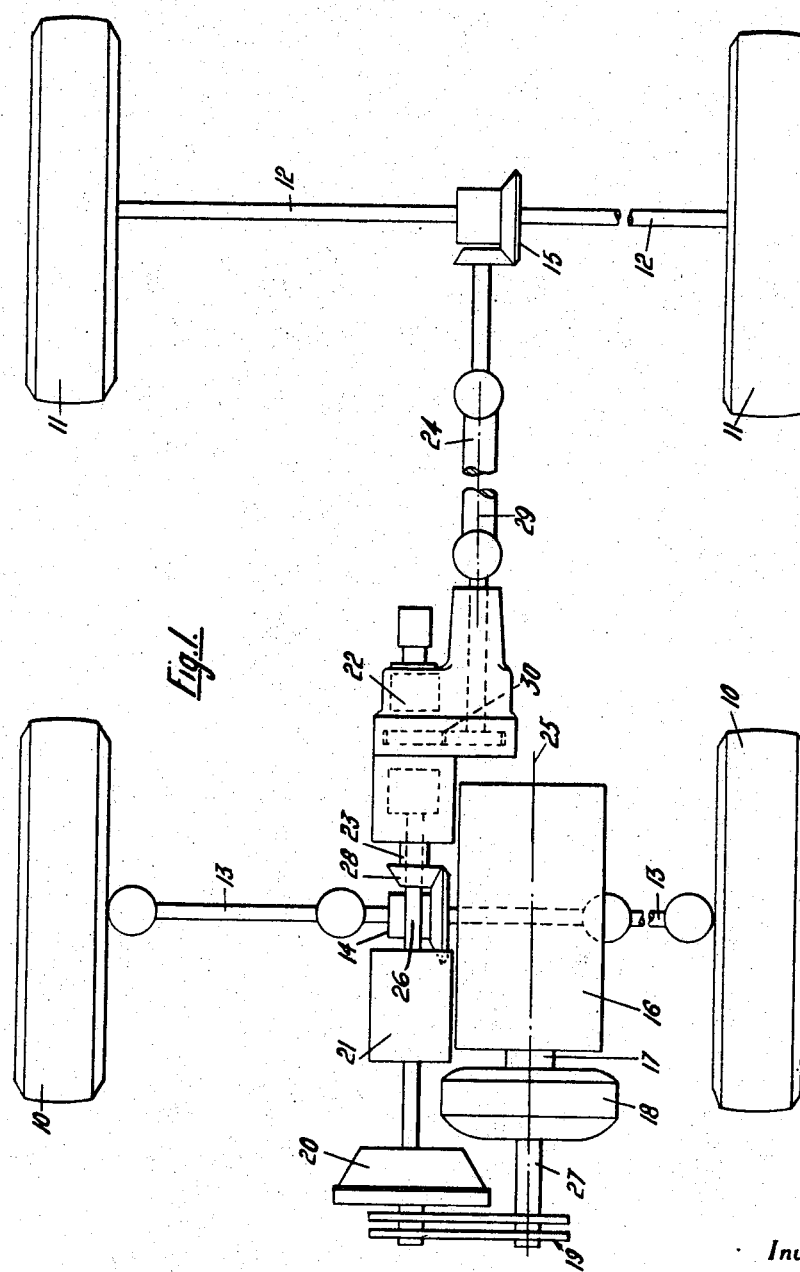

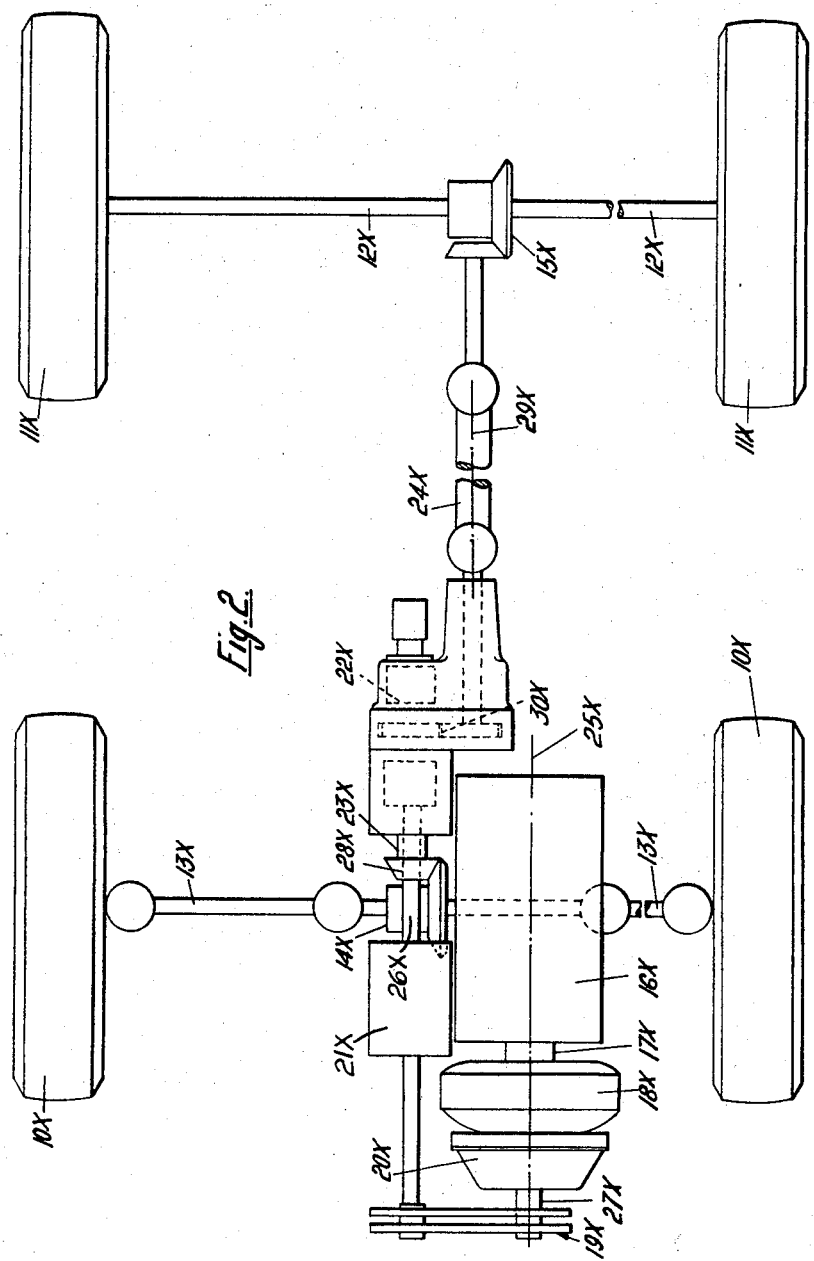

3,401,763
MOTOR VEHICLE DRIVE SYSTEM
Anthony P. R. Rolt, Stratford-on-Avon, England, assignor to Harry Ferguson Research Limited
Filed Oct. 18, 1965, Ser. No. 497,329
Claims priority, application Great Britain, Oct. 20, 1964, 42,675/64
11 Claims. (Cl. 180—44)

ABSTRACT OF THE DISCLOSURE

A four-wheel drive vehicle with the engine output end being the forward end of the engine and a drive path including clutching, gearing and a torque convertor for conveying engine power laterally from the engine and subsequently rearwardly to a driving connection with front and rear wheels with a controlled differential being provided on the drive path between the front and rear wheels.

---

According to the present invention, there is provided a motor vehicle drive system including at least one pair of driven road wheels which are disposed on opposite sides of the vehicle adjacent one end thereof, an interwheel differential gear unit having output drive members one in driving connection with each of the said wheels and a tubular input drive member arranged for rotation about an axis which extends longitudinally of the vehicle, an engine mounted adjacent said one end of the vehicle and arranged with its output shaft extending longitudinally of the vehicle on an axis spaced from and parallel to the axis of rotation of the said input drive member, the power output end of the output shaft being spaced away from the centre of the vehicle, a transmission shaft coaxial with the input drive member and extending therethrough, the transmission shaft thus having outboard and inboard portions respectively on opposite sides of the interwheel differential gear unit with respect to the longitudinal axis of the vehicle, drive transfer means providing a driving connection between the outboard portion of the transmission shaft and the power output end of the engine output shaft, a tubular drive shaft on the inboard portion of the transmission shaft and coaxial therewith and having one end drivingly connected to the said input drive member, and means providing a driving connection between the other end of the drive shaft and the inboard portion of the transmission shaft.

Further, according to the present invention there is provided a motor vehicle having an engine and a transmission connected thereto, and in which the engine is located adjacent one end of the vehicle with the engine output shaft disposed generally longitudinally of the vehicle, with the end of the engine output shaft which lies further from the centre of the vehicle being drivingly connected to the transmission, wherein the transmission includes two power transmitting paths in side-by-side relationship, gearing means connecting said paths and wherein one of said paths contains the vehicle engine and a torque converter and the other path extends alongside the engine.

Still further, according to the present invention, there is provided a motor vehicle drive system comprising, an engine mounted adjacent one end of the vehicle with its crank shaft extending longitudinally of the vehicle and having its power output end spaced away from the centre of the vehicle, a power drive train connected to the power output end of the engine for conveying power from the engine forwardly in alignment with the engine, then laterally to the side of the engine and then rearwardly for driving connection with front and rear wheels of the vehicle, and power drive train including a torque convertor, a clutch, and a gear box located upstream in the power drive train of a driving connection to a first set of wheels and additionally including a controlled differential located in the power train between the driving connection to the first set of wheels and a driving connection to the second set of wheels.

An embodiment of the invention will now be described by way of example with reference to the accompanying drawings in which:

FIG. 1 is a diagrammatic plan of a motion vehicle drive system in accordance with the present invention;

FIG. 2 is a modification of the system of FIG. 1.

In FIG. 1 of the drawings, a motor vehicle has a pair of front drive wheels 10 and a pair of rear drive wheels 11, the wheels of each pair being respectively interconnected by front and rear half shafts 12, 13. The half shafts are connected to front and rear interwheel gear units 14, 15 as shown.

The drive system of the vehicle further comprises a front mounted engine 16 having an output shaft 17 disposed longitudinally of the vehicle, a torque converter 18, gearing 19, a disengageable clutch 20, a change-speed gearbox 21 and a controlled centre differential gear 22 having an input element and two output elements. One output element of the centre differential gear 22 is connected to a front drive shaft or propeller shaft 23 and the other output element is connected to a rear drive shaft or propeller shaft 24 which shafts are respectively drivingly connected to inputs of the front and rear differential gear units 14, 15.

The arrangement is such that two side-by-side power transmission paths are provided, the first of said paths containing the vehicle engine 16 and the second path extending alongside the engine 16. The vehicle engine 16 is positioned with the power output end of its output shaft 17 spaced away from the centre of the vehicle so that the output shaft 17 extends forwardly and the latter is drivingly connected to the input of the torque converter 18, the output of which is a shaft 27. The second power-transmission path contains the clutch 20, gearbox 21 and controlled differential 22, these components being drivingly coupled in that order.

The drive from the converter output 27 is transmitted to the input of the disengageable clutch 20 by means of chain and sprocket drive transfer 19, but it will be understood that this is only a preferred form, and that the chain and sprocket drive transfer 19 could be replaced by, for example, spur gears.

The front propeller shaft 23, is formed as a tubular sleeve through which a transmission shaft 26 connecting the change speed gearbox and the controlled differential passes. The crown wheel pinion 28 of the front differential gear unit 14 is formed on the front end of the front propeller shaft 23.

The second power-transmission path is shown offset from the vehicle centre line 29 but by virtue of including a gear pair 30 in the centre differential the rear propeller shaft 24 is coincident with the vehicle centre line 29.

The purpose of providing a controlled centre-differential is to equip the vehicle so that excessive spinning of the front wheels or locking of the rear wheels will be arrested if such an event arises. In the event of such spinning or locking, the control means within the centre differential acts automatically to lock the differential so that torque is transmitted to both propeller shafts.

It will be noticed, particularly from the drawing, that the centre differential is disposed at the minimum distance from the vehicle engine and the other components are located forwardly of the rear of the engine. Therefore, there is substantially more passenger space in the vehicle described than in a conventional four-wheel drive vehicle in which a torque converter, clutch and gearbox are located rearwardly of the engine.

In the modified drive system shown in FIG. 2 parts already described with reference to FIG. 1 have been designated with the same reference numerals with the addition of the suffix x. The clutch 20x is incorporated in the first power transmission path and is positioned at the output of the torque converter 18x.

Other modifications within the scope of the appended claims may be made, for example the drive system may be adapted for use in a two-wheel drive vehicle, in which case the centre differential gear and either the front or the rear interwheel differential gear unit would be omitted. The drive system need not include all of the components mentioned; the torque converter, and/or the clutch and/or the gearbox may be omitted.

I claim:

1. A motor vehicle having an engine and a transmission connected thereto, and in which the engine is located adjacent one end of the vehicle with the engine output shaft disposed generally longitudinally of the vehicle with the end of the engine output shaft which lies further from the centre of the vehicle being drivingly connected to the transmission wherein the transmission includes two power transmitting paths in side-by-side relationship, gearing means connecting said paths and wherein one of said paths contains the vehicle engine and a torque convertor and the other path extends alongside the engine and includes a disengageable clutch and change speed gear box.

2. A motor vehicle having an engine and a transmission connected thereto, and in which the engine is located adjacent one end of the vehicle with the engine output shaft disposed generally longitudinally of the vehicle with the end of the engine output shaft which lies further from the centre of the vehicle being drivingly connected to the transmission wherein the transmission includes two power transmitting paths in side by side relationship, gearing means connecting said paths and wherein one of said paths contains the vehicle engine, a disengageable clutch and a torque convertor and the other path extends alongside the engine and includes a change speed gear box.

3. A motor vehicle according to claim 2, including a four-wheel drive with front and rear differential gears respectively having driving connections with front and rear roadwheels, the transmission including a differential gear adapted to be driven by the vehicle engine and having driving connections between the front and rear differential gears.

4. A motor vehicle drive system comprising, an engine mounted adjacent one end of the vehicle with its crank shaft extending longitudinally of the vehicle and having its power output end spaced away from the center of the vehicle, a power drive train connected to the power output end of the engine for conveying power from the engine forwardly in alignment with the engine, then laterally to the side of the engine and then rearwardly for driving connection with front and rear wheels of the vehicle, said power drive train including a torque convertor, a clutch, and a gear box located upstream in the power drive train of a driving connection to a first set of wheels and additionally including a control differential located in the power train between the driving connection to the first set of wheels and a driving connection to the second set of wheels.

5. The system of claim 4 wherein said torque convertor is located in alignment with said engine and said clutch, gear box and control differential are located laterally of said engine.

6. The system of claim 4 wherein said torque convertor and said clutch are located in alignment with said engine and said gear box and control differential are located in lateral spaced position from said engine.

7. A motor vehicle drive system including at least one pair of driven road wheels which are disposed on opposite sides of the vehicle adjacent one end thereof, an interwheel differential gear unit having output drive members one in driving connection with each of the said wheels and a tubular input drive member arranged for rotation about an axis which extends longitudinally of the vehicle, an engine mounted adjacent said one end of the vehicle and arranged with its output shaft extending longitudinally of the vehicle on an axis spaced from and parallel to the axis of rotation of the said input drive member, the power output end of the output shaft being spaced away from the centre of the vehicle, a transmission shaft coaxial with the input drive member and extending therethrough, the transmission shaft thus having outboard and inboard portions respectively on opposite sides of the interwheel differential gear unit with respect to the longitudinal axis of the vehicle, drive transfer means providing a driving connection between the outboard portion of the transmission shaft and the power output end of the engine output shaft, a tubular drive shaft on the inboard portion of the transmission shaft and coaxial therewith and having one end drivingly connected to the said input drive member, and means providing a driving connection between the other end of the drive shaft and the inboard portion of the transmission shaft.

8. The system of claim 7, wherein the said means providing a driving connection between the said other end of the drive shaft and the inboard portion of the transmission shaft comprises a centre differential gear having an input element and two output elements, the input element being connected to the transmission shaft and one of the output elements being connected to the drive shaft, and including a second pair of driven road wheels spaced towards the other end of the vehicle from said one pair of driven road wheels, another interwheel differential gear unit drivingly connected to the wheels of the said second pair, and another drive shaft having one end thereof connected to an input to the said other interwheel differential gear unit and having its other end in driving connection with the other output element of the centre differential gear.

9. The system of claim 8 including gearing in the driving connection between the said other end of the other drive shaft and the other output element of the centre differential gear whereby the axis of rotation of the other drive shaft is offset with respect to the axis of rotation of the transmission shaft.

10. The system of claim 9, wherein said centre differential gear is a controlled differential gear.

11. The system of claim 7, wherein said drive transfer means includes a change-speed gear box having an output shaft coaxial with the said transmission shaft, and a disengageable clutch providing a driving connection between the said output shaft and the transmission shaft.

References Cited
UNITED STATES PATENTS

| | | | |
|---|---|---|---|
| 1,770,279 | 7/1930 | Morrison | 180—42 |
| 2,092,040 | 9/1937 | Aitken | 180—54 |
| 2,199,517 | 5/1940 | Best | 180—54 |
| 2,714,936 | 8/1955 | Gregory | 180—44 |
| 2,800,037 | 7/1957 | Czuba et al. | 180—70 X |
| 3,029,662 | 4/1962 | Hause | 74—688 X |
| 3,235,021 | 2/1966 | Hill | 180—44 |

A. HARRY LEVY, *Primary Examiner.*